(12) United States Patent
Gerdes et al.

(10) Patent No.: US 11,663,369 B2
(45) Date of Patent: May 30, 2023

(54) COMBINING SIGNALS FROM MULTIPLE SENSORS TO FACILITATE EMI FINGERPRINT CHARACTERIZATION OF ELECTRONIC SYSTEMS

(71) Applicant: Oracle International Corporation, Redwood Shores, CA (US)

(72) Inventors: Matthew T. Gerdes, Oakland, CA (US); Kenny C. Gross, Escondido, CA (US); Guang C. Wang, San Diego, CA (US); Shreya Singh, La Jolla, CA (US); Aleksey M. Urmanov, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 357 days.

(21) Appl. No.: 17/090,131

(22) Filed: Nov. 5, 2020

(65) Prior Publication Data

US 2022/0138358 A1    May 5, 2022

(51) Int. Cl.
*G06F 21/00* (2013.01)
*G06F 21/88* (2013.01)

(52) U.S. Cl.
CPC .................................. *G06F 21/88* (2013.01)

(58) Field of Classification Search
CPC ...... G06F 21/6245; G06F 21/87; G06F 21/88; G06F 21/71; G06F 21/72; G06F 21/60
See application file for complete search history.

(56) References Cited

U.S. PATENT DOCUMENTS

| 7,613,576 | B2 * | 11/2009 | Gross | ...................... G06F 11/00 |
| | | | | 702/77 |
| 10,141,929 | B2 * | 11/2018 | Rakova | .................... G06F 3/014 |
| 10,410,034 | B2 * | 9/2019 | Strohmann | ........ G06V 40/1335 |
| 10,671,231 | B2 * | 6/2020 | Bau | .......................... G06F 1/163 |
| 10,733,116 | B2 * | 8/2020 | Litichever | ........... G06F 13/4282 |

\* cited by examiner

*Primary Examiner* — Hosuk Song
(74) *Attorney, Agent, or Firm* — Park, Vaughan, Fleming & Dowler LLP

(57) ABSTRACT

During operation, the system uses N sensors to sample an electromagnetic interference (EMI) signal emitted by a target asset while the target asset is running a periodic workload, wherein each of the N sensors has a sensor sampling frequency f, and wherein the N sensors perform sampling operations in a round-robin ordering with phase offsets between successive samples. During the sampling operations, the system performs phase adjustments among the N sensors to maximize phase offsets between successive sensors in the round-robin ordering. Next, the system combines samples obtained through the N sensors to produce a target EMI signal having an EMI signal sampling frequency $F = f \times N$. The system then generates a target EMI fingerprint from the target EMI signal. Finally, the system compares the target EMI fingerprint against a reference EMI fingerprint for the target asset to determine whether the target asset contains any unwanted electronic components.

20 Claims, 6 Drawing Sheets

COMBINING SIGNALS FROM MULTIPLE SENSORS TO FACILITATE EMI FINGERPRINT CHARACTERIZATION OF ELECTRONIC SYSTEMS

BACKGROUND

Field

The disclosed embodiments generally relate to techniques for detecting unwanted components in electronic systems. More specifically, the disclosed embodiments relate to an anticoherence resampling technique that aggregates signals from multiple low-cost software-defined radio (SDR) sensors to generate an EMI fingerprint, which is used to detect unwanted components in electronic systems.

Related Art

Unwanted electronic components, such as spy chips, mod chips or counterfeit components, are causing problems in critical assets, such as computer servers and utility system components. For example, bad actors will sometimes piggyback a "spy chip" onto a regular chip, or wire a "mod chip" onto a motherboard of a critical asset to facilitate eavesdropping on operations of the critical asset. Counterfeit components also create problems because they often perform poorly, or fail within a short period of time.

Techniques have been developed to detect such unwanted components in enterprise computing systems based on electro-magnetic interference (EMI) fingerprints, which are analyzed using prognostic-surveillance techniques. (For example, see U.S. Pat. No. 8,069,480, entitled "Detecting Counterfeit Electronic Components Using EMI Telemetric Fingerprints" by inventors Kenny C. Gross, et al., filed 16 Oct. 2007, which is incorporated by reference herein.)

The above-described technique operates by first obtaining a reference EMI fingerprint (referred to as a "golden fingerprint") from a reference asset of the same type as a target asset, which is certified not to contain unwanted electronic components. Next, the technique obtains a target EMI fingerprint from the target asset and compares the target EMI fingerprint against the golden fingerprint to determine whether the target asset contains any unwanted electronic components.

To make this technique practical, it is advantageous to use low-cost software-defined radios (SDRs), which are attached to antennas, to obtain the signals that are used to generate the EMI fingerprints. However, to perform some types of detection, it is necessary to perform EMI fingerprint scans beyond the frequency range that these low-cost SDR sensors can measure.

Hence, what is needed is a technique for increasing the frequency range of these low-cost SDR sensors to measure higher frequency signals that can be used to more effectively detect unwanted components in electronic systems.

SUMMARY

The disclosed embodiments provide a system that detects unwanted electronic components in a target asset. During operation, the system uses N sensors to sample an electromagnetic interference (EMI) signal emitted by the target asset while the target asset is running a periodic workload, wherein each of the N sensors has a sensor sampling frequency f, and wherein the N sensors perform sampling operations in a round-robin ordering with phase offsets between successive samples. While the N sensors are performing the sampling operations, the system performs phase adjustments among the N sensors to maximize phase offsets between successive sensors. Next, the system combines samples obtained through the N sensors to produce a target EMI signal having an EMI signal sampling frequency $F = f \times N$. The system then generates a target EMI fingerprint from the target EMI signal. Finally, the system compares the target EMI fingerprint against a reference EMI fingerprint for the target asset to determine whether the target asset contains any unwanted electronic components.

In some embodiments, while dynamically performing the phase adjustments, the system uses a time-domain technique, which adjusts the phase offsets to minimize cross-correlations among signals from different sensors.

In some embodiments, while dynamically performing the phase adjustments, the system uses a cross-power spectral density (CPSD) technique, which: performs computations in the frequency-domain to infer phase angles between signals from different sensors; and uses the inferred phase angles to perform phase adjustments to maximize phase offsets between successive sensors in the round-robin ordering.

In some embodiments, while generating the target EMI fingerprint from the target EMI signal, the system: performs a target Fast Fourier Transform (FFT) operation on the target EMI signal to transform the target EMI signals from a time-domain representation to a frequency-domain representation; partitions an output of the target FFT operation into a set of frequency bins; constructs a target amplitude time-series signal for each of the frequency bins in the set of frequency bins; selects a subset of frequency bins that are associated with the highest average correlation coefficients; and generates the target EMI fingerprint by combining reference amplitude time-series signals for each of the selected subset of frequency bins.

In some embodiments, while selecting the subset of frequency bins, the system: computes cross-correlations between pairs of amplitude time-series signals associated with pairs of the set of frequency bins; computes an average correlation coefficient for each of the frequency bins based on the cross-correlations; and selects a subset of frequency bins that are associated with the highest average correlation coefficients.

In some embodiments, prior to obtaining the target EMI signals, the system generates the reference EMI fingerprint. During this process, the system obtains a reference EMI signal, which is generated by a reference asset of the same type as the target asset while the reference asset is running the periodic workload, wherein the reference asset is certified not to contain unwanted electronic components. The system then generates the reference EMI fingerprint from the reference EMI signal.

In some embodiments, while comparing the target EMI fingerprint against the reference EMI fingerprint, the system computes a cumulative mean absolute error (CMAE) between time-series signals in the target EMI fingerprint and time-series signals in the reference EMI fingerprint. The system then compares the CMAE against a threshold value to determine whether the target asset contains any unwanted electronic components.

In some embodiments, while comparing the target EMI fingerprint against the reference EMI fingerprint, the system feeds target time-series signals from the target EMI fingerprint into an inferential model to produce estimated values for the target time-series signals, wherein the inferential model was previously trained based on time-series signals from the reference EMI fingerprint. Next, the system performs pairwise differencing operations between actual values and the estimated values for the target time-series signals to produce residuals. Finally, the system analyzes the residuals to determine whether the target asset contains any unwanted electronic components.

In some embodiments, while analyzing the residuals, the system computes a CMAE based on the residuals, and then compares the CMAE against a threshold value to determine whether the target asset contains any unwanted electronic components.

In some embodiments, while analyzing the residuals, the system performs a sequential probability ratio test (SPRT) on the residuals to produce SPRT alarms. The system then determines from the SPRT alarms whether the target asset contains any unwanted electronic components.

In some embodiments, the periodic workload comprises a square-wave-shaped workload.

In some embodiments, the periodic workload comprises a sinusoidal workload.

In some embodiments, the target asset comprises a computer system.

In some embodiments, the target asset comprises a utility system component.

DETAILED DESCRIPTION

Figure 1:
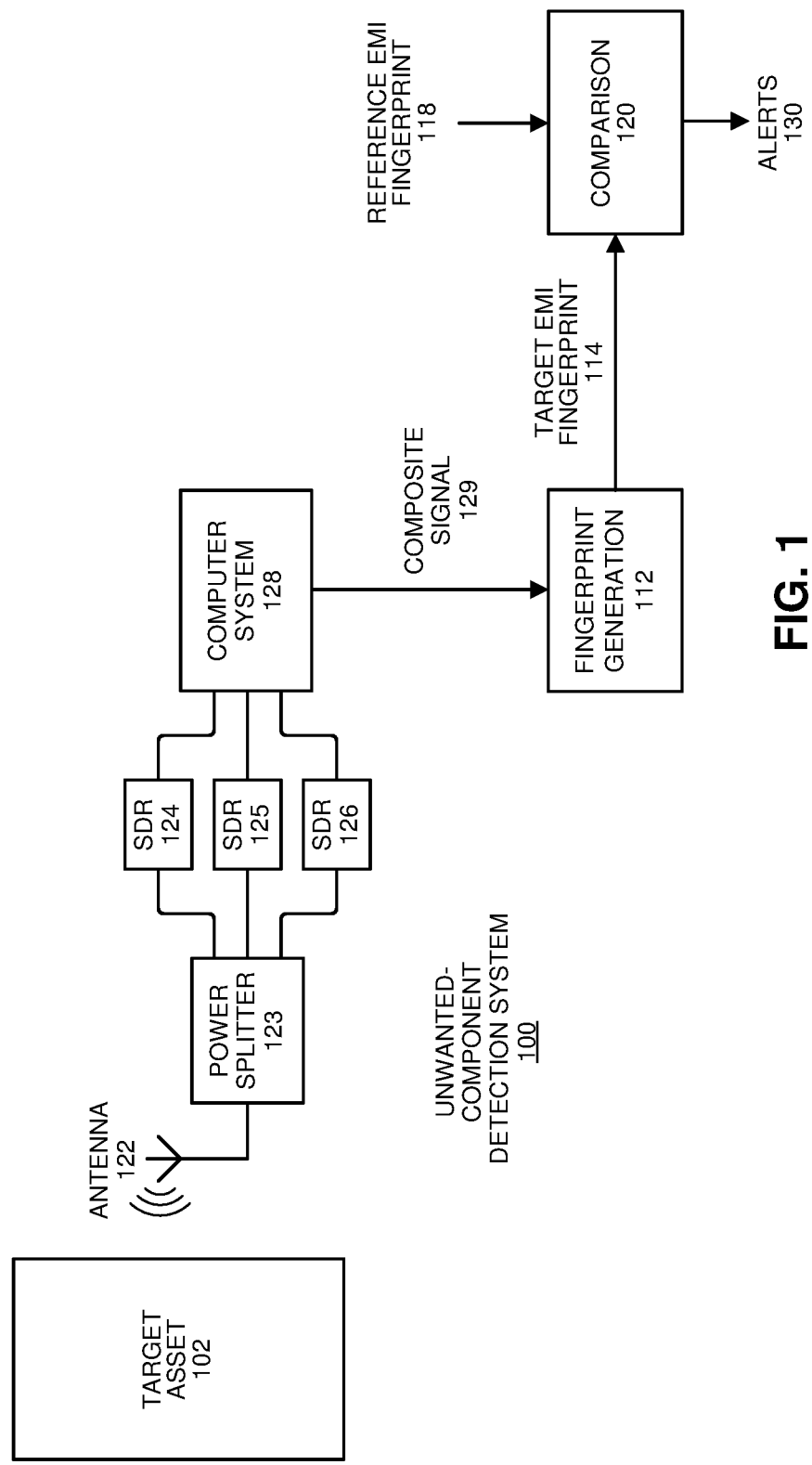
FIG. 1 illustrates an unwanted-component detection system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Discussion

As mentioned above, it is advantageous to use low-cost software-defined radios (SDRs) and associated antennas to obtain the signals to generate the EMI fingerprints. However, in some cases, it is necessary to perform EMI fingerprint scans beyond the frequency range that these low-cost SDR sensors can measure. For example, suppose we have inexpensive SDRs that can measure a frequency range from 1 MHz to 1.5 GHz, but for a specific use case we need to perform measurements up to 4.5 GHz.

This is problematic because a system that performs such high-frequency measurements can be expensive. This is due to a number of factors. First, the Nyquist theorem states that detecting a given phenomenon requires a sample rate, which is at least twice the frequency of the phenomenon being monitored. This higher frequency is known as the "Nyquist frequency." Because of the Nyquist frequency, characterizing ultra-high-frequency phenomena requires fast and expensive sampling instrumentation, such as a high-speed oscilloscope. However, it is often impractical to use this type of sampling equipment in many real-world use cases, such as for counterfeit or spy chip detection because designing systems for higher sampling rates can greatly increase system size, memory requirements, weight, computing power, required battery capacity, and I/O bandwidth. All of these factors can greatly increase system cost.

Our disclosed system achieves high sampling rates without the need for expensive oscilloscopes. This is accomplished by using multiple low-cost SDR-based sensors to perform the sampling operation. For example, it is possible to simultaneously sample a signal using three low-cost SDR sensors with a maximum sampling frequency of 1.5 GHz, and to interleave the resulting sampled signals to produce to produce a composite signal with a sampling frequency of 4.5 GHz.

However, if the sampling operations for the three low-cost SDR sensors are all started at exactly the same time, all three SDR sensors will be sampling the sample data values at 1.5 GHz. So, even if the sampled signals are subsequently "merged," the sampling rate of the merged sampled signals will still be 1.5 GHz. This is because the sampling is "coherent" across the three SDR sensors.

However, if the sampling operations for three SDR sensors are not started simultaneously, but are instead staggered in phase, the resulting signals will be "incoherent." For example, if N low-cost SDR sensors (Sensor 1, Sensor 2 and Sensor 3) are sampled at their maximum sampling frequencies, and the samples for consecutive Sensors 1, 2 and 3 are staggered by a nominal phase shift, and the three resulting signals are systematically combined in the time-domain using software, it is possible to sample at a frequency that is "approximately" equal to the maximum frequency of each SDR sensor times N. Note that we use the term "approximately" because if we do not precisely optimize the spacing between samples, the "anticoherence" will be suboptimal, which causes the maximum multiplied frequency to be suboptimal. Moreover, note that designing systems that provide higher sampling rates using low-cost SDR sensors can greatly reduce system size, memory requirements, weight, computing power, required battery capacity, and I/O bandwidth.

It is possible to achieve maximal incoherence among a set of N SDR sensors by dynamically adjusting the phase shift between successive sensors to be very close to 180/N degrees out of phase. (For example, if there are three SDR sensors, the technique maintains consecutive samples close to 60 degrees out of phase.)

We next describe an unwanted component detection system, which uses multiple low-cost SDR sensors to achieve a high-frequency sampling rate.

Unwanted-Component Detection System

FIG. 1 illustrates an exemplary unwanted-component detection system 100 in accordance with the disclosed embodiments. As illustrated in FIG. 1, unwanted-component detection system 100 gathers EMI signals from a target asset 102. Target asset 102 can generally include any type of critical asset, such as a component in a utility electrical distribution system, a computer server, or a machine in a factory.

As illustrated in FIG. 1, the system 100 gathers EMI signals, which are emitted by target asset 102 using an antenna 122. Antenna 122 is coupled to a power splitter 123, which splits the signal received through antenna 122 and feeds the resulting split signals into the SDRs 124-126. SDRs 124-126 are configured to perform sampling operations on the split signals, and the resulting sampled signals are fed into computer system 128. Computer system 128 combines the sampled signals from SDRs 124-126 to produce a higher-frequency composite signal 129 through a process, which is described in more detail below. During this process, computer system 128 performs phase adjustments among SDRs 124-126 to ensure that SDRs 124-126 perform sampling operations in a round-robin ordering with equally spaced phase offsets between successive samples.

The composite signal 129 generated by computer system 128 feeds into a fingerprint-generation module 112, which generates a target EMI fingerprint 114 based on the composite signal 129. Target EMI fingerprint 114 can then be compared against a reference EMI fingerprint 118 by comparison module 120. (Note that reference EMI fingerprint 118 was previously generated by a reference asset of the same type as target asset 102, wherein the reference asset is certified not to contain unwanted electronic components.) If comparison module 120 determines that target asset 102 contains any unwanted electronic components, then comparison module 120 can generate alerts 130.

In some embodiments, comparison module 120 computes a CMAE between time-series signals in the target EMI fingerprint 114 and time-series signals in the reference EMI fingerprint 118. The system then compares the CMAE against a threshold value to determine whether the target asset contains any unwanted electronic components.

In other embodiments, comparison module 120 uses a multivariate state estimation (MSET) pattern-recognition model, which is trained using time-series signals from reference EMI fingerprint 118, to determine whether target asset 102 contains any unwanted electronic components. Note that the term MSET as used in this specification refers to a technique that loosely represents a class of model-based pattern-recognition techniques. (For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000.) Hence, the term "MSET" as used in this specification can refer to any technique outlined in [Gribok], including Ordinary Least Squares (OLS), Support Vector Machines (SVM), Artificial Neural Networks (ANNs), MSET, or Regularized MSET (RMSET).

While determining whether target asset 102 contains any unwanted electronic components, the trained MSET model is used to predict what each time-series signal in the target EMI fingerprint should be, based on other correlated variables to produce "estimated signal values." The system then performs a pairwise-differencing operation between actual signal values and these estimated signal values to produce residuals. Next, the system uses a sequential probability ratio test (SPRT) to detect anomalies and to generate associated SPRT alarms. (For a description of SPRT, please see Wald, Abraham, June 1945, "Sequential Tests of Statistical Hypotheses." *Annals of Mathematical Statistics*. 16 (2): 117-186.) The system then determines the presence of unwanted components inside target asset 102 based on tripping frequencies of the SPRT alarms.

Process for Detecting Unwanted Components

Figures 2, 3:
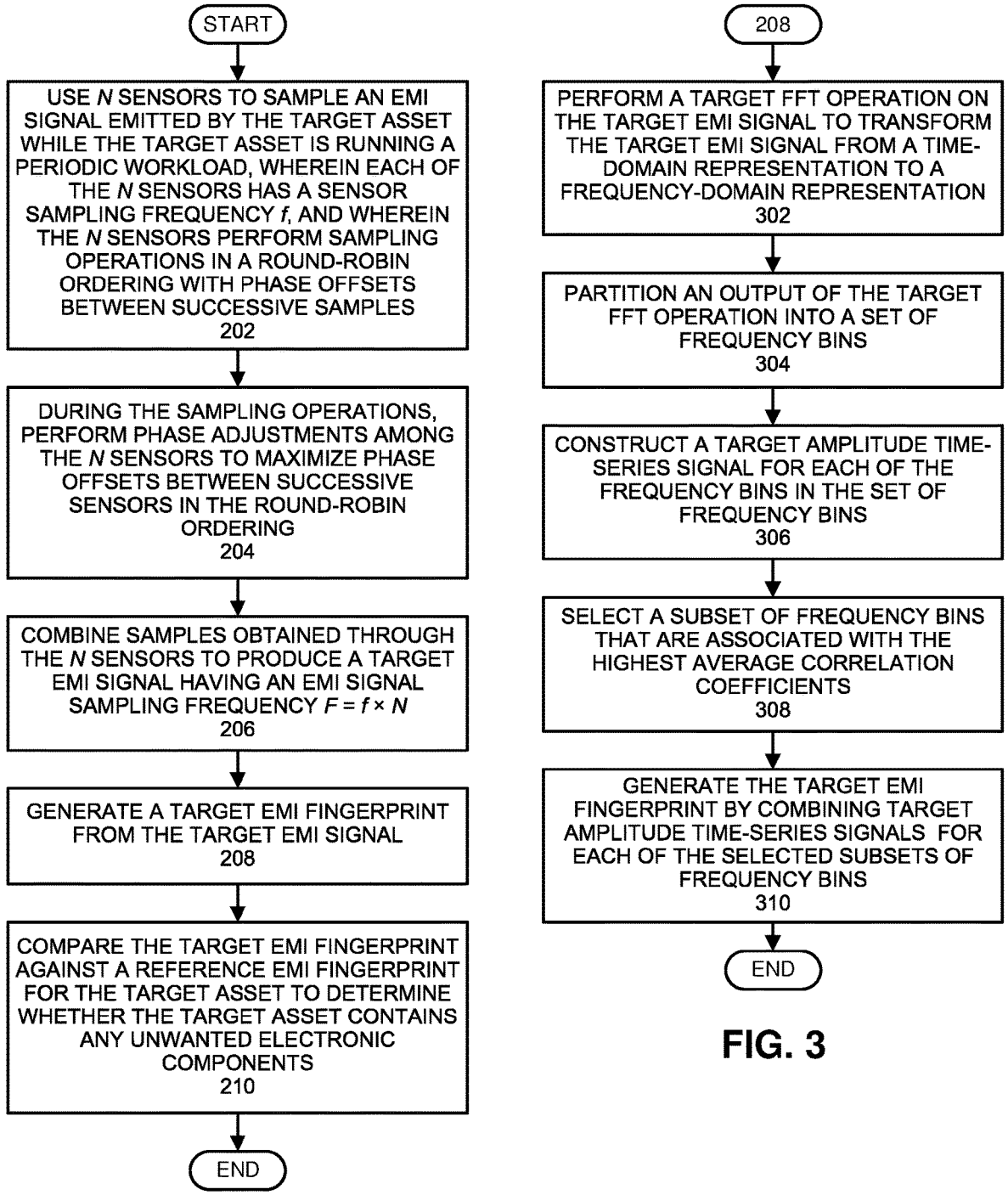
FIG. 2 presents a flow chart illustrating a process for detecting unwanted components in a target asset in accordance with the disclosed embodiments.
FIG. 3 presents a flow chart illustrating a process for generating a target EMI fingerprint from target EMI signals in accordance with the disclosed embodiments.

FIG. 2 presents a flow chart illustrating a process for detecting unwanted electronic components in a target asset in accordance with the disclosed embodiments. During this process, the system uses N sensors to sample an EMI signal emitted by the target asset while the target asset is running a periodic workload, wherein each of the N sensors has a sensor sampling frequency f, and wherein the N sensors perform sampling operations in a round-robin ordering with phase offsets between successive samples (step 202). During the sampling operations, the system performs phase adjustments among the N sensors to maximize phase offsets between successive sensors in the round-robin ordering (step 204). Next, the system combines samples obtained through the N sensors to produce a target EMI signal having an EMI signal sampling frequency $F=f \times N$ (step 206). The system then generates a target EMI fingerprint from the target EMI signal (step 208). Finally, the system compares the target EMI fingerprint against a reference EMI fingerprint for the target asset to determine whether the target asset contains any unwanted electronic components (step 210).

FIG. 3 presents a flow chart illustrating a process for generating a target EMI fingerprint from target EMI signals in accordance with the disclosed embodiments. (This flow chart illustrates in more detail the operations performed in step 208 of the flow chart in FIG. 2.) While generating the target EMI fingerprint from the target EMI signal, the system performs a target FFT operation on the target EMI signal to transform the target EMI signal from a time-domain representation to a frequency-domain representation (step 302). Next, the system partitions an output of the target FFT operation into a set of frequency bins (step 304). The system then constructs a target amplitude time-series signal for each of the frequency bins in the set of frequency bins (step 306), and selects a subset of frequency bins that are associated with the highest average correlation coefficients (step 308). Finally, the system generates the target EMI fingerprint by combining target amplitude time-series signals for each of the selected subsets of frequency bins (step 310).

Figure 4:
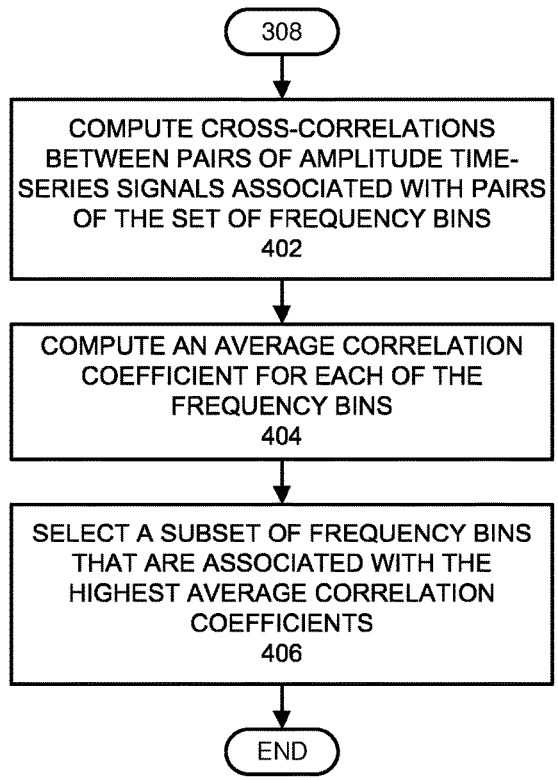
FIG. 4 presents a flow chart illustrating a process for selecting frequency bins with the highest correlation coefficients in accordance with the disclosed embodiments.

FIG. 4 presents a flow chart illustrating a process for selecting a subset of frequency bins with the highest correlation coefficients in accordance with the disclosed embodiments. (This flow chart illustrates in more detail the operations performed in step 308 of the flow chart in FIG. 3.) The system first computes cross-correlations between pairs of amplitude time-series signals associated with pairs of the set of frequency bins (step 402). Next, the system computes an average correlation coefficient for each of the frequency bins (step 404). Finally, the system selects a subset of frequency bins that are associated with the highest average correlation coefficients (step 406).

Figure 5:
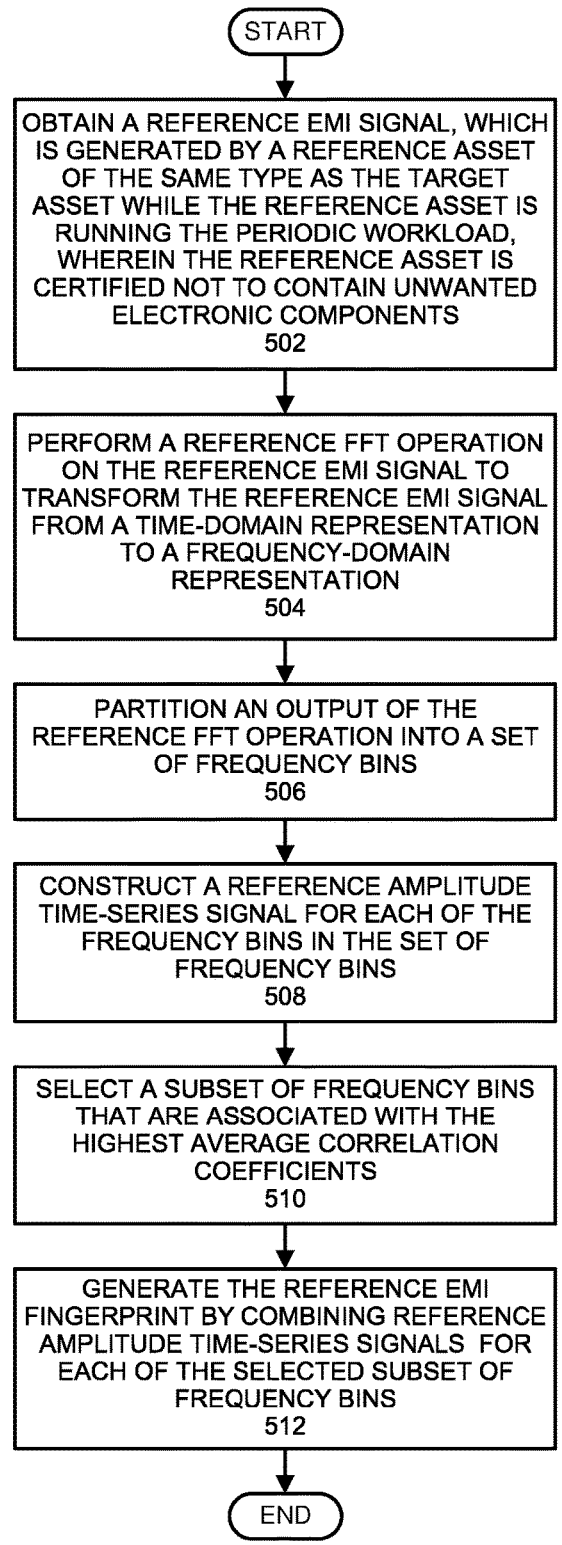
FIG. 5 presents a flow chart illustrating a process for generating a reference EMI fingerprint in accordance with the disclosed embodiments.

FIG. 5 presents a flow chart illustrating a process for generating a reference EMI fingerprint in accordance with the disclosed embodiments. During this process, the system obtains a reference EMI signal, which is generated by a reference asset of the same type as the target asset while the reference asset is running the periodic workload, wherein the reference asset is certified not to contain unwanted electronic components (step 502). The system then performs a reference FFT operation on the reference EMI signal to transform the reference EMI signal from a time-domain representation to a frequency-domain representation (step 504). Next, the system partitions an output of the reference FFT operation into a set of frequency bins (step 506). The system then constructs a reference amplitude time-series signal for each of the frequency bins in the set of frequency bins (step 508), and selects a subset of frequency bins that are associated with the highest average correlation coefficients (step 510). Finally, the system generates the reference EMI fingerprint by combining target amplitude time-series signals for each of the selected subset of frequency bins (step 512).

Figure 6A:
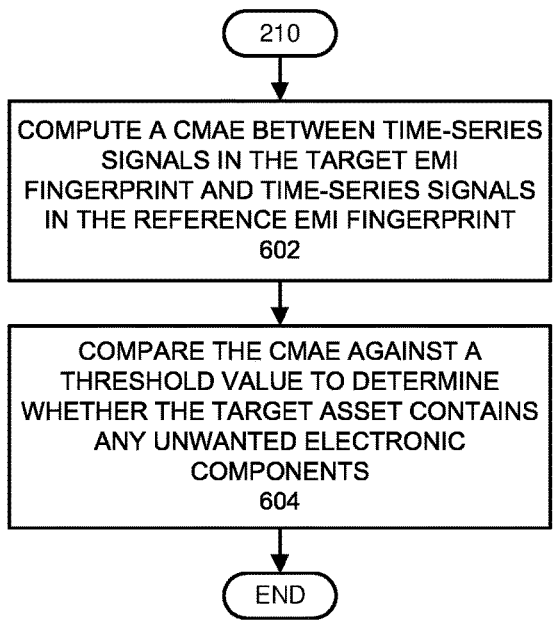
FIG. 6A presents a flow chart illustrating a process for comparing the target EMI fingerprint against the reference EMI fingerprint in accordance with the disclosed embodiments.

FIG. 6A presents a flow chart illustrating a process for comparing the target EMI fingerprint against the reference EMI fingerprint in accordance with the disclosed embodiments. (This flow chart illustrates in more detail the operations performed in step 210 of the flow chart illustrated in FIG. 2.) During this process, the system computes a cumulative mean absolute error (CMAE) between time-series signals in the target EMI fingerprint and time-series signals in the reference EMI fingerprint (step 602). The system then compares the CMAE against a threshold value to determine whether the target asset contains any unwanted electronic components (step 604).

Figure 6B:
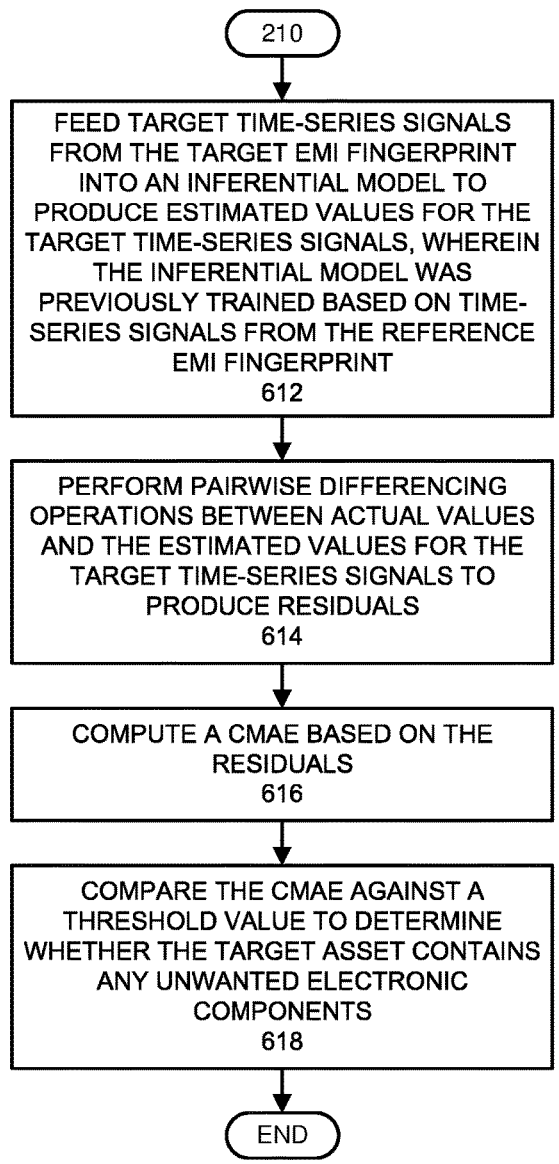
FIG. 6B presents a flow chart illustrating an alternative process for comparing the target EMI fingerprint against the reference EMI fingerprint in accordance with the disclosed embodiments.

FIG. 6B presents a flow chart illustrating an alternative process for comparing the target EMI fingerprint against the reference EMI fingerprint in accordance with the disclosed embodiments. (This flow chart illustrates in more detail the operations performed in step 210 of the flow chart illustrated in FIG. 2.) During this process, the system feeds target time-series signals from the target EMI fingerprint into an inferential model to produce estimated values for the target time-series signals, wherein the inferential model was previously trained based on time-series signals from the reference EMI fingerprint (step 612). Next, the system performs pairwise differencing operations between actual values and the estimated values for the target time-series signals to produce residuals (step 614). The system then computes a CMAE based on the residuals (step 614). Finally, the system compares the CMAE against a threshold value to determine whether the target asset contains any unwanted electronic components (step 616).

Figure 6C:
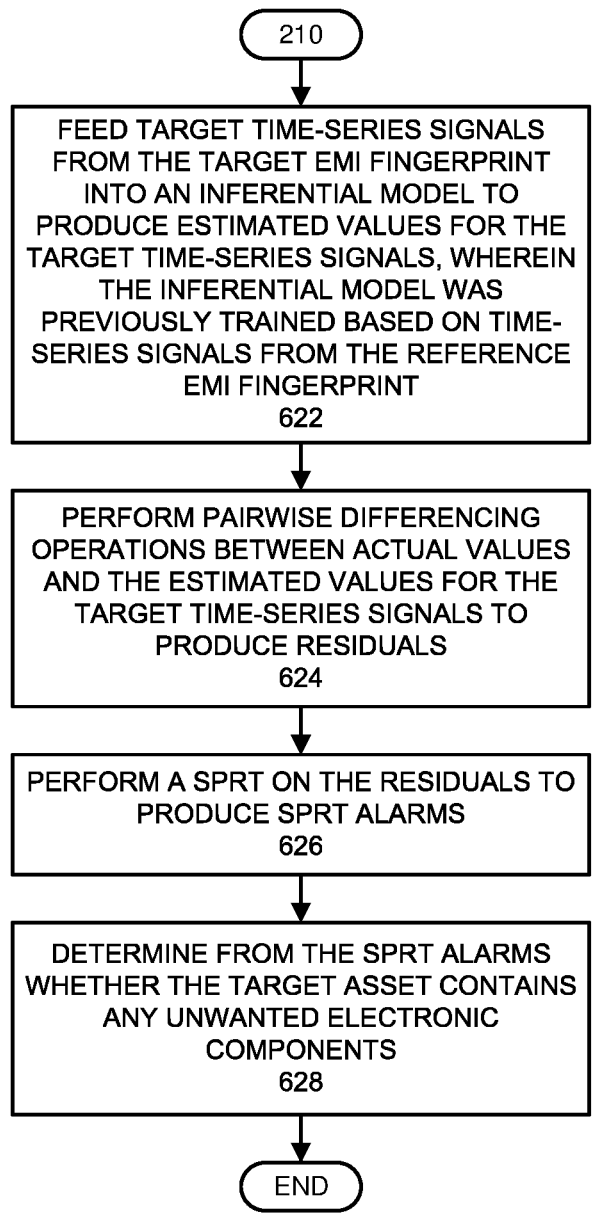
FIG. 6C presents a flow chart illustrating a variation on the alternative process for comparing the target EMI fingerprint against the reference EMI fingerprint in accordance with the disclosed embodiments.

FIG. 6C presents a flow chart illustrating a variation on the alternative process for comparing the target EMI fingerprint against the reference EMI fingerprint in accordance with the disclosed embodiments. (This flow chart illustrates in more detail the operations performed in step 210 of the flow chart illustrated in FIG. 2.) During this process, the system feeds target time-series signals from the target EMI fingerprint into an inferential model to produce estimated values for the target time-series signals, wherein the inferential model was previously trained based on time-series signals from the reference EMI fingerprint (step 622). Next, the system performs pairwise differencing operations between actual values and the estimated values for the target time-series signals to produce residuals (step 624). The system then performs a SPRT on the residuals to produce SPRT alarms (step 626). Finally, the system determines from the SPRT alarms whether the target asset contains any unwanted electronic components (step 628).

Details of the Sampling and Combining Processes

Figure 7:
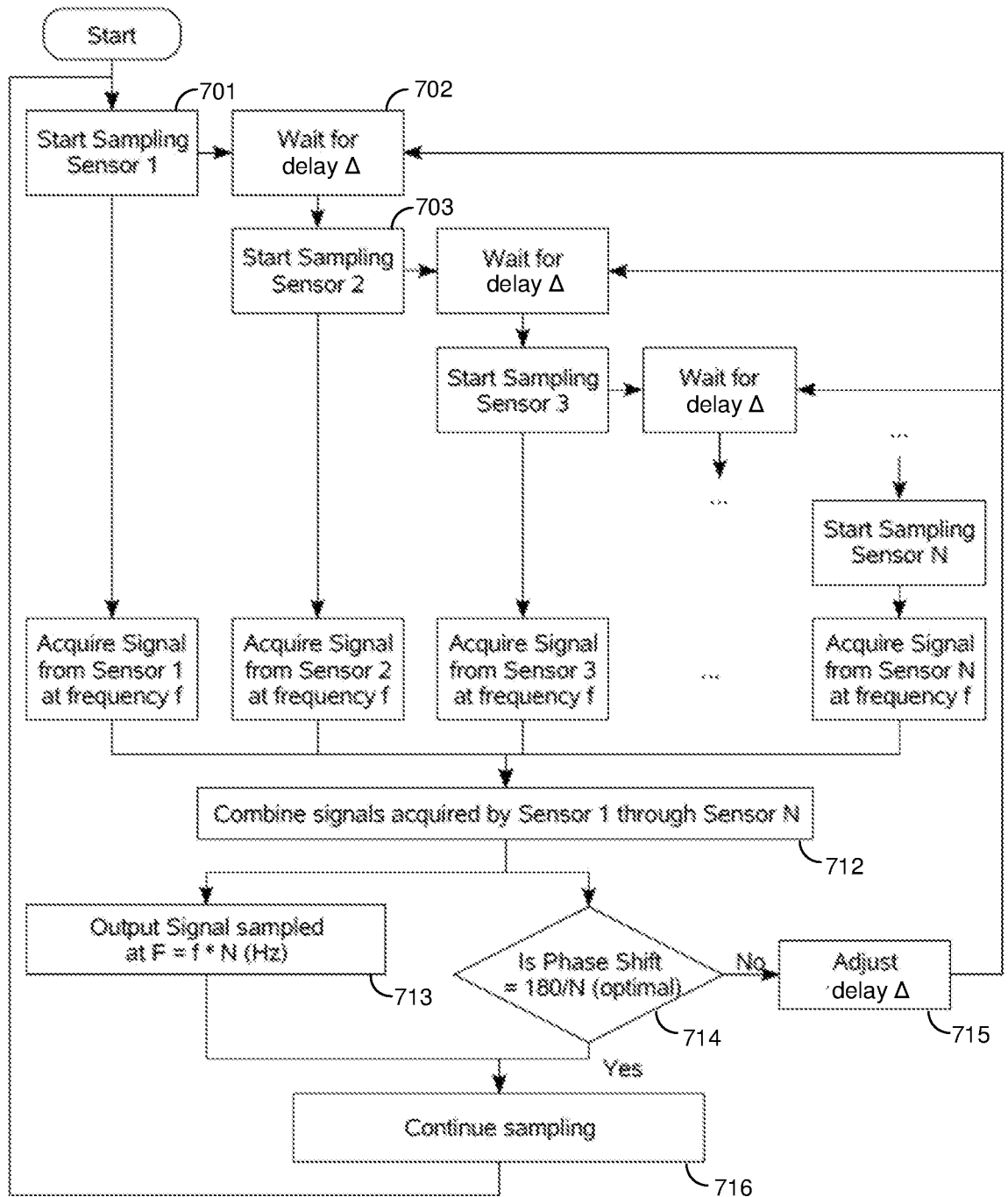
FIG. 7 presents a flow chart for the anticoherence resampling technique in accordance with the disclosed embodiments.

FIG. 7 presents a flow chart illustrating details of the sampling and combining processes, which occur during steps 202, 204 and 206 of the flow chart illustrated in FIG. 2. Referring to FIG. 7, sensor 1 starts sampling immediately (step 701) while sensor 2 starts sampling (step 703) after waiting for a delay $\Delta$ (step 702). Note that all subsequent sensors, from sensor 2 to sensor N, are delayed by an additional $\Delta$. The acquired signals are then combined in the time domain (step 712), and then the combined signal having a frequency F=f*N is subsequently outputted (step 713). The combined signal is also converted back into the frequency domain where checks are performed using a conditional statement (step 714). If this condition is met ("Yes" at step 714), the optimal time delay between sensors has been reached and the system continues sampling (step 716). If this condition is not met ("No" at step 714), the delay $\Delta$ between consecutive sensor samples is adjusted (step 715) to maximize phase offsets between consecutive sensors and the previous steps are repeated.

As mentioned above, maximizing the phase offsets can involve a time-domain approach or a frequency-domain approach. In the time-domain approach, the system adjusts the phase offsets to minimize cross-correlations among signals from the different sensors. (Note that this cross-correlation computation can be performed using functions that are available in commercial software packages, such as MATLAB™.) In the frequency-domain approach, the system can use the CPSD technique, which: performs computations in the frequency-domain to infer phase angles between signals from different sensors; and uses the inferred phase angles to perform phase adjustments to maximize phase offsets between successive sensors. (Note that the CPSD computation can be performed using functions that are available in commercial software packages, such as MATLAB™.)

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting unwanted electronic components in a target asset, comprising:
   using N sensors to sample an electromagnetic interference (EMI) signal emitted by the target asset while the target asset is running a periodic workload, wherein each of the N sensors has a sensor sampling frequency f, and wherein the N sensors perform sampling operations in a round-robin ordering with phase offsets between successive samples;
   while the N sensors are performing the sampling operations, performing phase adjustments among the N sensors to maximize phase offsets between successive sensors in the round-robin ordering;
   combining samples obtained through the N sensors to produce a target EMI signal having an EMI signal sampling frequency F=f×N;
   generating a target EMI fingerprint from the target EMI signal; and
   comparing the target EMI fingerprint against a reference EMI fingerprint for the target asset to determine whether the target asset contains any unwanted electronic components.

2. The method of claim 1, wherein dynamically performing the phase adjustments involves using a time-domain technique, which adjusts the phase offsets to minimize cross-correlations among signals from different sensors.

3. The method of claim 1, wherein dynamically performing the phase adjustments involves using a cross-power spectral density (CPSD) technique, which: performs computations in the frequency-domain to infer phase angles between signals from different sensors; and uses the inferred phase angles to perform phase adjustments to maximize phase offsets between successive sensors in the round-robin ordering.

4. The method of claim 1, wherein generating the target EMI fingerprint from the target EMI signal involves:
   performing a target Fast Fourier Transform (FFT) operation on the target EMI signal to transform the target EMI signals from a time-domain representation to a frequency-domain representation;
   partitioning an output of the target FFT operation into a set of frequency bins;
   constructing a target amplitude time-series signal for each of the frequency bins in the set of frequency bins;
   selecting a subset of frequency bins that are associated with the highest average correlation coefficients; and
   generating the target EMI fingerprint by combining reference amplitude time-series signals for each of the selected subset of frequency bins.

5. The method of claim 4, wherein selecting the subset of frequency bins involves:
   computing cross-correlations between pairs of amplitude time-series signals associated with pairs of the set of frequency bins;
   computing an average correlation coefficient for each of the frequency bins based on the cross-correlations; and
   selecting a subset of frequency bins that are associated with the highest average correlation coefficients.

6. The method of claim 1, wherein prior to obtaining the target EMI signals, the method further comprises generating the reference EMI fingerprint by:
   obtaining a reference EMI signal, which is generated by a reference asset of the same type as the target asset while the reference asset is running the periodic workload, wherein the reference asset is certified not to contain unwanted electronic components; and
   generating the reference EMI fingerprint from the reference EMI signal.

7. The method of claim 1, wherein comparing the target EMI fingerprint against the reference EMI fingerprint involves:
   computing a cumulative mean absolute error (CMAE) between time-series signals in the target EMI fingerprint and time-series signals in the reference EMI fingerprint; and
   comparing the CMAE against a threshold value to determine whether the target asset contains any unwanted electronic components.

8. The method of claim 1, wherein comparing the target EMI fingerprint against the reference EMI fingerprint involves:
   feeding time-series signals from the target EMI fingerprint into an inferential model to produce estimated values for the target time-series signals, wherein the inferential model was previously trained based on time-series signals from the reference EMI fingerprint;
   performing pairwise differencing operations between actual values and the estimated values for the target time-series signals to produce residuals; and
   analyzing the residuals to determine whether the target asset contains any unwanted electronic components.

9. The method of claim 1, wherein the periodic workload comprises one of:
   a square-wave-shaped workload; and
   a sinusoidal workload.

10. The method of claim 1, wherein the target asset comprises one of:
    a computer system; and
    a utility system component.

11. A non-transitory, computer-readable storage medium storing instructions that when executed by a computer cause the computer to perform a method for detecting unwanted electronic components in a target asset, wherein the method comprises:
    using N sensors to sample an electromagnetic interference (EMI) signal emitted by the target asset while the target asset is running a periodic workload, wherein each of the N sensors has a sensor sampling frequency f, and wherein the N sensors perform sampling operations in a round-robin ordering with phase offsets between successive samples;
    while the N sensors are performing the sampling operations, performing phase adjustments among the N sensors to maximize phase offsets between successive sensors in the round-robin ordering;
    combining samples obtained through the N sensors to produce a target EMI signal having an EMI signal sampling frequency F=f×N;

generating a target EMI fingerprint from the target EMI signal; and comparing the target EMI fingerprint against a reference EMI fingerprint for the target asset to determine whether the target asset contains any unwanted electronic components.

12. The non-transitory, computer-readable storage medium of claim 11, wherein dynamically performing the phase adjustments involves using a time-domain technique, which adjusts the phase offsets to minimize cross-correlations among signals from different sensors.

13. The non-transitory, computer-readable storage medium of claim 11, wherein dynamically performing the phase adjustments involves using a cross-power spectral density (CPSD) technique, which: performs computations in the frequency-domain to infer phase angles between signals from different sensors; and uses the inferred phase angles to perform phase adjustments to maximize phase offsets between successive sensors in the round-robin ordering.

14. The non-transitory, computer-readable storage medium of claim 11, wherein generating the target EMI fingerprint from the target EMI signal involves:

performing a target Fast Fourier Transform (FFT) operation on the target EMI signal to transform the target EMI signals from a time-domain representation to a frequency-domain representation;

partitioning an output of the target FFT operation into a set of frequency bins;

constructing a target amplitude time-series signal for each of the frequency bins in the set of frequency bins;

computing cross-correlations between pairs of amplitude time-series signals associated with pairs of the set of frequency bins;

computing an average correlation coefficient for each of the frequency bins based on the cross-correlations;

selecting a subset of frequency bins that are associated with the highest average correlation coefficients; and generating the target EMI fingerprint by combining reference amplitude time-series signals for each of the selected subset of frequency bins.

15. The non-transitory, computer-readable storage medium of claim 11, wherein prior to obtaining the target EMI signals, the method further comprises generating the reference EMI fingerprint by:

obtaining a reference EMI signal, which is generated by a reference asset of the same type as the target asset while the reference asset is running the periodic workload, wherein the reference asset is certified not to contain unwanted electronic components; and generating the reference EMI fingerprint from the reference EMI signal.

16. The non-transitory, computer-readable storage medium of claim 11, wherein comparing the target EMI fingerprint against the reference EMI fingerprint involves:

computing a cumulative mean absolute error (CMAE) between time-series signals in the target EMI fingerprint and time-series signals in the reference EMI fingerprint; and comparing the CMAE against a threshold value to determine whether the target asset contains any unwanted electronic components.

17. The non-transitory, computer-readable storage medium of claim 11, wherein comparing the target EMI fingerprint against the reference EMI fingerprint involves:

feeding time-series signals from the target EMI fingerprint into an inferential model to produce estimated values for the target time-series signals, wherein the inferential model was previously trained based on time-series signals from the reference EMI fingerprint;

performing pairwise differencing operations between actual values and the estimated values for the target time-series signals to produce residuals; and analyzing the residuals to determine whether the target asset contains any unwanted electronic components.

18. A system that detects unwanted electronic components in a target asset, comprising:

at least one processor and at least one associated memory; and a detection mechanism that executes on the at least one processor, wherein the detection mechanism:

uses N sensors to sample an electromagnetic interference (EMI) signal emitted by the target asset while the target asset is running a periodic workload, wherein each of the N sensors has a sensor sampling frequency f, and wherein the N sensors perform sampling operations in a round-robin ordering with phase offsets between successive samples;

while the N sensors are performing the sampling operations, performs phase adjustments among the N sensors to maximize phase offsets between successive sensors in the round-robin ordering;

combines samples obtained through the N sensors to produce a target EMI signal having an EMI signal sampling frequency F=f×N;

generates a target EMI fingerprint from the target EMI signal; and compares the target EMI fingerprint against a reference EMI fingerprint for the target asset to determine whether the target asset contains any unwanted electronic components.

19. The system of claim 18, wherein while dynamically performing the phase adjustments, the detection mechanism uses a time-domain technique, which adjusts the phase offsets to minimize cross-correlations among signals from different sensors.

20. The system of claim 18, wherein while dynamically performing the phase adjustments, the detection mechanism uses a cross-power spectral density (CPSD) technique, which: performs computations in the frequency-domain to infer phase angles between signals from different sensors; and uses the inferred phase angles to perform phase adjustments to maximize phase offsets between successive sensors in the round-robin ordering.

* * * * *